United States Patent

Scher et al.

[11] Patent Number: 6,047,593
[45] Date of Patent: Apr. 11, 2000

[54] PROCESS AND ARRANGEMENT FOR MONITORING A BELT OR CHAIN DRIVE OF AN INTERNAL COMBUSTION ENGINE

[75] Inventors: Uwe Scher, Cremlingen; Jörn Kahrstedt, Berlin, both of Germany

[73] Assignee: Volkswagen AG, Wolfsburg, Germany

[21] Appl. No.: 09/361,898

[22] Filed: Jul. 27, 1999

Related U.S. Application Data

[63] Continuation of application No. PCT/EP98/00996, Feb. 10, 1998.

[30] Foreign Application Priority Data

Feb. 12, 1997 [DE] Germany ............... 197 05 257

[51] Int. Cl.⁷ ............................................. G01M 15/00
[52] U.S. Cl. .................................................. 73/118.1
[58] Field of Search ..................... 73/116, 117.2, 73/117.3, 118.1, 119 R; 123/90.15; 701/105

[56] References Cited

U.S. PATENT DOCUMENTS 4,716,864  1/1988  Binder .
4,834,694  5/1989  Martin .
5,357,932  10/1994 Clinton et al. .
5,548,995  8/1996  Clinton et al. .
5,584,274  12/1996 Fukai et al. .
5,689,067  11/1997 Klein et al. .

FOREIGN PATENT DOCUMENTS 2670831  11/1991  France .
4440656  5/1995   Germany .

Primary Examiner—Eric S. McCall
Attorney, Agent, or Firm—Baker & Botts L.L.P.

[57] ABSTRACT

In order to monitor and compensate for undesirable elongation of a belt or chain drive of an internal combustion engine, a control computer determines the start and time duration of fuel injection and corrects the time duration as a function of the phase relation between the engine crankshaft and a shaft having a cam for controlling fuel injection so that a desired nominal fuel quantity is injected even if belt or chain elongation causes the phase relation between the shafts to be changed.

6 Claims, 2 Drawing Sheets

PROCESS AND ARRANGEMENT FOR MONITORING A BELT OR CHAIN DRIVE OF AN INTERNAL COMBUSTION ENGINE

REFERENCE TO RELATED APPLICATIONS

This application is a continuation of International Application No. PCT/EP98/00996 filed Feb. 10, 1998.

BACKGROUND OF THE INVENTION

This invention relates to a process and arrangement for monitoring belt or chain drives of internal combustion engines.

U.S. Pat. No. 5,689,067 discloses a process for monitoring wear of a timing chain in a motor vehicle engine by making measurements, in a non-contacting way, at a chain wheel on the crankshaft side and a chain wheel on the camshaft side, providing signals regarding the phase relation of the two wheels relative to each other, comparing the phase relation determined in real time during operation of the internal combustion engine to a predetermined nominal value and, if a deviation is present, generating a signal indicating unacceptable elongation of the chain. This process is intended to detect, in a timely fashion, unacceptably severe wear of the timing chain as a result of uniform elongation of the chain as well as elongation resulting from damage to an individual link. As a result of this monitoring, precautionary, and possibly unnecessary, replacement of the chain is avoided. Instead, the timing chain can be replaced only when it is truly necessary. Effects on engine operation that could result from an elongation of the timing chain are not discussed in this patent.

Independently of the elongation of such a timing chain, it is known, for example from U.S. Pat. No. 5,357,932, to undertake computer-controlled determination of the quantity of fuel injected in the individual cylinders of internal combustion engines which use a device for controlled change of the phase relation between a camshaft and the crankshaft driving it. A camshaft adjusting arrangement and a process for measuring the angular position of an adjustable camshaft are described in German Offenlengungsschrift No. 44 40 656 in which, when the engine is started, the first cylinder to be fired in a predefined firing order is determined, the angular position of the camshaft is measured and calculated, and this information is stored or utilized by an engine control unit for determining injection and fuel control parameters.

SUMMARY OF THE INVENTION

Accordingly, it is an object of the invention to provide a process and arrangement for monitoring a belt or chain drive of an internal combustion engine which overcomes disadvantages of the prior art.

Another object of the invention is to provide a process and arrangement of this type which largely avoids undesirable effects on engine operation resulting from elongation of a belt or chain drive of an internal combustion engine.

These and other objects of the invention are attained by providing a process and apparatus in which, starting from a non-elongated state of a belt or chain drive, data values for control of a fuel metering device, which are dependent on at least one of two sensor signals indicating the phase relation between two wheels connected by the chain or belt drive, are determined in a control unit associated with the internal combustion engine. The data values are determined in a functional module in which the data values exhibit a nominal relationship to intake and exhaust valve control devices of the internal combustion engine as a function of the performance characteristics of the engine. This has the result that, for a given operating point of the internal combustion engine based on the performance characteristic, the fuel metering device is actuated in accordance with the determined data values to deliver a nominal quantity of fuel.

Moreover, in an additional functional module of the control unit, a correction value is determined for these data values as a function of the signal relating to the phase relation of the two wheels and is superimposed on the data values, thus forming corrected values. This is accomplished in such a way that a hypothetical fuel quantity, which would be set with an elongation chain or belt drive while using the determined data values, and which would result in a deviation from the desired engine operation, is changed to a fuel quantity value corrected for optimal engine operation.

The process and apparatus in accordance with the invention thus eliminate any incorrect adjustment in the relationship between fuel injection and intake and exhaust valve control that results from elongation of the belt or chain drive.

The process and apparatus are useful in both spark-ignition and compression-ignition internal combustion engines, and moreover are independent of the type of belt or chain drive.

The process is particularly advantageous with direct-injection compression-ignition internal combustion engines, particularly in engines of this type which are equipped with pump nozzle elements that are actuated by a camshaft that simultaneously actuates the intake and exhaust valve control cams.

The process is also advantageously applicable if a fuel injection pump common to all cylinders of the internal combustion engine is actuated by the belt or chain drive. In other words, an arrangement in which the belt passes partially around at least three wheels.

In accordance with the invention, provision is preferably made for the data values to be determined as values for the beginning and the time duration of fuel injection. The process can be performed in a particularly simple manner if correction values for only the time duration of fuel injection are applied.

Furthermore, provision can advantageously be made for the hypothetical fuel quantity to be determined in the control unit with the aid of a calculation rule, and for a correction value for the fuel injection duration to be determined computationally with the aid of the difference calculated from comparison of the hypothetical fuel quantity with the nominal fuel quantity. In this way, the process advantageously relies only on existing signals from which the necessary correction factors are calculated. The selection of corrected data from performance characteristics, which is complicated to determine, can thus be avoided.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
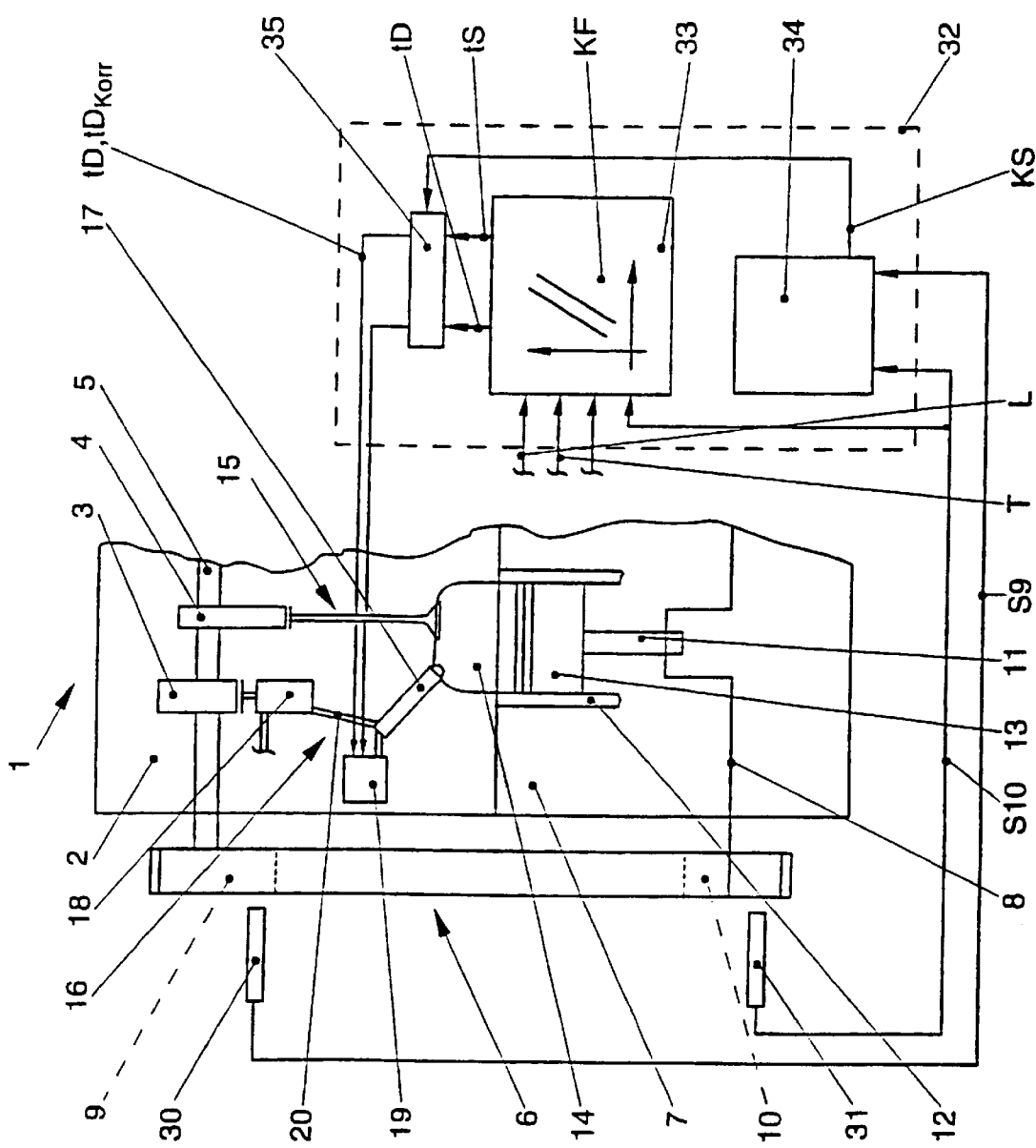
FIG. 1 is a schematic block diagram illustrating a representative embodiment of an arrangement for monitoring a belt or chain drive of an internal combustion engine in accordance with the invention.

In the typical embodiment of the invention shown in FIG. 1, an internal combustion engine 1 has a cylinder head 2 containing a rotatably mounted shaft 5 carrying various cams 3 and 4 which is driven by a belt or chain drive 6 from a crankshaft 8 that is rotatably mounted in a crankcase 7.

The belt or chain drive 6, indicated in FIG. 1 as a drive belt by way of example, passes over two pulleys 9 and 10 affixed to the shafts 5 and 8, respectively.

The crankshaft 9 is connected by way of connecting rods 11 to corresponding pistons 13 which can move up and down in cylinders 12.

Above each cylinder 12 there is a combustion chamber 14 having associated intake and exhaust valves 15 as well as a fuel injection nozzle 17 which is part of a fuel metering arrangement 16. The fuel metering arrangement 16 also includes a pump 18, a solenoid valve 19 and a fuel line 20 that conducts fuel pumped and pressurized by the pump 18 to the fuel injection nozzle 17.

Adjacent to the pulleys 9 and 10 are corresponding position sensors 30 and 31 providing output signals S9 and S10 which are transmitted to a control unit 32 containing several functional modules 33–35. In one functional module 33, fuel injection control data values tS and tD are determined from an engine performance characteristic diagram KF using several received parameters, for example the signal S10, an engine load signal L, an engine temperature signal T, and the like. These data values define the fuel injection start time in the form of the value tS, in other words the start of a given fuel injection step by the fuel injection nozzle 17, and the injection duration in the form of the value tD, that is, the time duration of that fuel injection step.

During operation of the internal combustion engine 1, these data values tS and tD exhibit a performance characteristic-dependent nominal relationship to the operation of the intake and exhaust valves 15 and the fuel metering device 16 since the shaft 5 with its cams 3 and 4 is rotationally coupled by the belt or chain drive 6 to the rotation of the crankshaft 8, which defines the nominal relationship of the operation of these components to the position of the piston 13.

Figure 2:
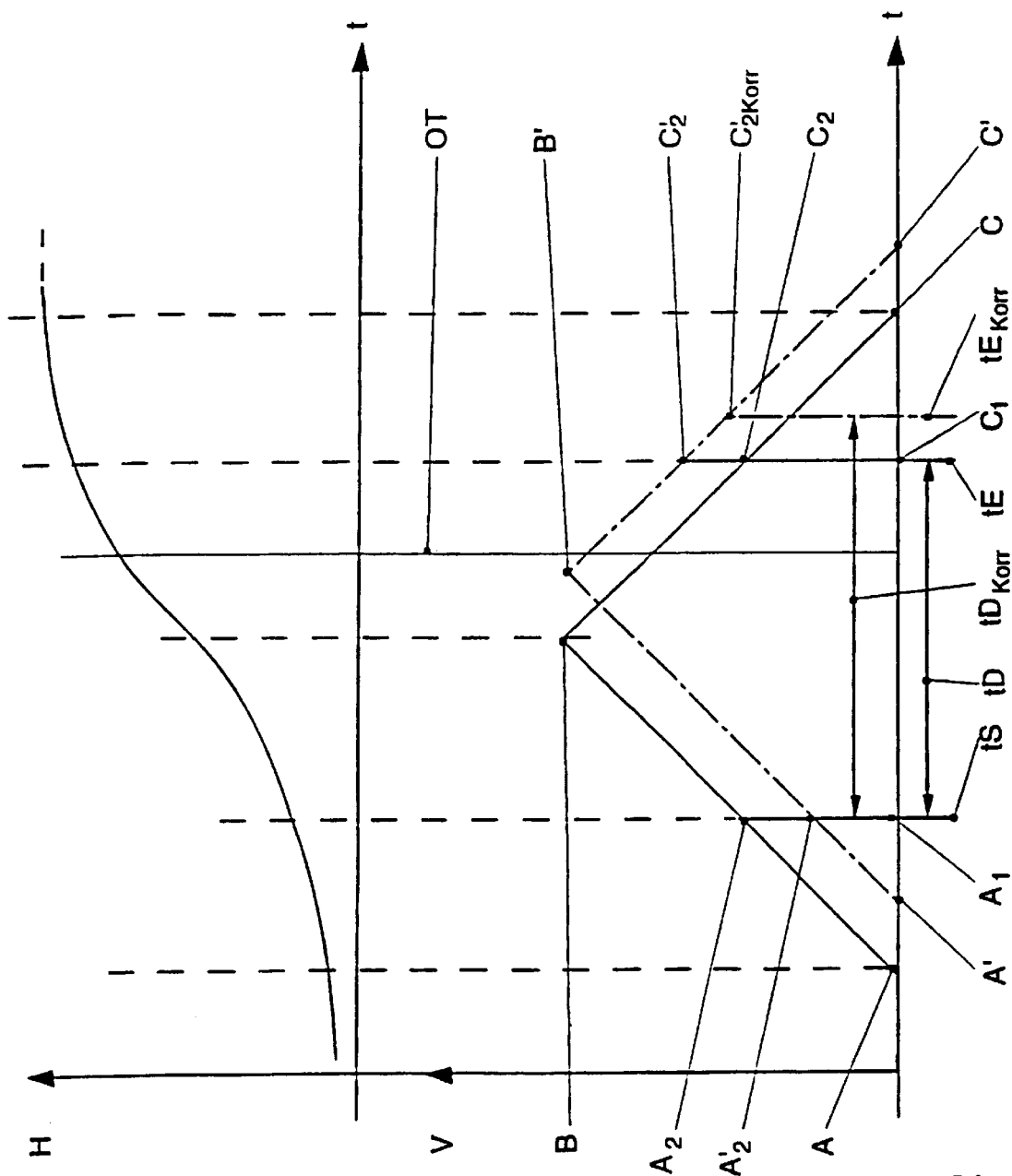
FIG. 2 is a graphical illustration depicting time sequences for various fuel injection steps carried out by the arrangement shown in FIG. 1.

The time sequence of this nominal relationship is explained in greater detail with reference to FIG. 2 which in its upper section shows the progression H of the cam 3 over the time t, in place of which the crank angle of the crankshaft could also be shown. In the lower section of FIG. 2, the lift velocity progression V over time t is shown for the cam 3, which can also be designated as the fuel delivery control cam. A triangular fuel delivery control cycle is represented in FIG. 2 by the corner points A, B and C. As a function of the signal S10 and other input data a data value pair tS and tD are determined by the functional module 33 from a certain region of the performance characteristic diagram KF and are transmitted to the solenoid valve 19. At the time tS the solenoid valve 19 opens so that a fuel injection cycle can begin and the delivered fuel quantity is determined by the time duration tD. This means the fuel injection ends at a time tE which is determined from the start time tS and the duration tD. The quantity of injected fuel MKS is thus determined by the shape of the curve $A_1, A_2, B, C_2, C_1$. In other words it corresponds to the area under this curve.

A vertical line OT in FIG. 2 represents the time of top dead center (TDC) for the piston 13 in a certain operating region of the internal combustion engine 1.

The signals S9 and S10 representing the positions of the pulleys 9 and 10 and the corresponding shafts 5 and 8 are continuously sent to the functional module 34 during operation of the internal combustion engine. Nominal values for the phase relation PHI of the two shafts 5 and 8 with respect to each other based on the signals are stored in this module. If an undesired elongation of the belt or chain drive 7 occurs during operation of the internal combustion engine 1, the relative positions of the shafts 5 and 8 with respect to each other will change as a result. This produces a shift of the triangle ABC in the "late" direction, i.e., to the right in FIG. 2, so that a velocity progression along a displaced curve A', B', C'of FIG. 2 is established.

It can easily be seen that an undesired change in the fuel quantity MKS to a different quantity MKS' can arise as a result of this shift if the data values tS and tD remained otherwise unchanged. This hypothetical fuel quantity MKS' would be represented by the area below the curve $A_1, A'_2, B', C'_2, C_1$. As a consequence of this asymmetric curve, this hypothetical fuel quantity MKS' would be smaller than the predefined nominal fuel quantity MKS. In other words, there would be an undesired mismatch of the fuel actually delivered to the desired fuel quantity. To avoid this mismatch, a comparator in the functional module 34 continuously compares the signals S9 and S10 and, in case of a deviation of these signals from nominal values, transmits an appropriate correction signal KS, corresponding to the current phase relation PHI, to the functional module 35 of the control computer 32. The data values tS and Td read from the performance characteristic diagram KF of the functional module 33 are also supplied to the functional module 35. Using a calculation rule stored in a memory, the module 35 calculates the nominal fuel quantity MKS based on the data value pair tS and tD and the known lift progression V over the time interval CD. In addition, the hypothetical fuel quantity MKS' which would result from the undesired elongation of the belt or chain if tS and tD were unchanged is calculated in the functional module 35 on the basis of the correction signal KS. By computational comparison of the values MKS and MKS', the change in the quantity of fuel is determined and the data value tD is then combined with a correction value so that a corrected injection duration $tD_{korr}$ is established in such a way as to compensate the change in fuel quantity while maintaining the start of fuel injection at the time tS.

In the illustrated example, the shifting of the peak point B toward B' results in a reduced hypothetical fuel quantity MKS' as compared to the intended nominal fuel quantity MKS, so that when the data value tS is retained the corrected duration $tD_{korr}$ is larger than tD. As a result of the increased duration of injection, the curve reflecting the corrected fuel quantity MKS at the end $tE_{korr}$ of fuel injection is identified in FIG. 2 by the corner points $C'_{2korr}$ and $tD_{korr}$.

It is of course possible to deviate from the above-described exemplary embodiment by varying the start tS of fuel injection instead of the data value tD or a combination of corrections of tS and tD is likewise possible. Moreover, if desired the pump 18, injection nozzle 17, solenoid valve 19 and line 20, shown separately in FIG. 1 for clarity, can be combined into a unitary pump-nozzle assembly.

The relationship between the piston top dead center TDC and the fuel injection cam is, as already mentioned above, an example for a specific operating point of the internal combustion engine 1. Depending on the performance characteristic the peak point B can be closer in time to piston TDC or can fall after the TDC point in time. In the latter case, the fuel quantity MKS that results is determined exclusively by an area under a curve which includes the descending line B, C or B', C'.

Although the invention has been described herein with reference to specific embodiments, many modifications and variations therein will readily occur to those skilled in the art. Accordingly, all such variations and modifications are included within the intended scope of the invention.

We claim:

1. A process for monitoring a belt or chain drive of an internal combustion engine that passes over at least two wheels, one of which drives a cam which is associated with a fuel metering device for the engine and another of which is associated with a crankshaft for the engine, comprising:

providing a sensor for each wheel to produce signals from which a phase relation of the wheels relative to each other can be determined;

generating a signal indicating an elongation of the belt or chain drive if the phase relation of the wheels deviates from a nominal value;

determining in a control computer associated with the internal combustion engine and from an engine performance characteristic diagram, data values for the fuel metering device based on factors including signals from the sensors which have a performance characteristic-dependent nominal relationship to intake and exhaust valves of the internal combustion engine in such a manner that, at a performance characteristic-dependent operating point of the internal combustion engine, the fuel metering device is actuated in accordance with the data values to deliver a nominal fuel quantity;

determining a correction signal for the data values as a function of the sensor signals; and generating a corrected data value so that a hypothetical fuel quantity which would result from an elongation of the belt or chain drive and which deviates from the nominal fuel quantity is corrected to the value of the nominal fuel quantity.

2. A process in accordance with claim 1 wherein the data values are values for the start and the duration of fuel injection.

3. A process in accordance with claim 2 wherein the corrected data value is the data value for the duration of fuel injection.

4. A process in accordance with claim 3 wherein the control computer precalculates the hypothetical fuel quantity that would result from an elongation of the belt or chain drive if the data values for the nominal fuel quantity were retained using a calculation rule and compares the hypothetical fuel quantity with the nominal fuel quantity and calculates the correction value for the duration of injection from the difference.

5. An arrangement for monitoring a belt or chain drive of an internal combustion engine comprising a chain or belt drive;

a fuel metering device for controlling injection of fuel in the engine in accordance with data values;

a plurality of wheels engaged by the chain or belt drive, one of which drives a cam associated with the fuel metering device for the engine;

a sensor for each wheel arranged to produce signals from which a phase relation of the wheels relative to each other can be determined and from which elongation of the belt or chain drive from a nominal value can be detected;

a control computer for the engine containing a performance characteristic diagram for determining data values for the fuel metering device and for determining a corrected data value based on the signals representing the phase relation between the wheels as detected by the sensors so that, at a performance characteristic-dependent operating point of the engine, the fuel metering device is operated in accordance with the data values corrected for any elongation of the belt or chain device; and wherein one wheel is associated with a crankshaft of the internal combustion engine and another wheel is associated with a shaft having cams which periodically actuates intake and exhaust valves and the fuel metering device.

6. An arrangement in accordance with claim 5 wherein the fuel metering device includes a cam-actuated pump and a fuel injection nozzle, and a shutoff element, actuated as a function of the data values, is included in a flow path between the pump and the nozzle.

* * * * *